United States Patent
Ye et al.

(10) Patent No.: US 9,342,193 B2
(45) Date of Patent: May 17, 2016

(54) TOUCH PANEL WITH A CONDUCTIVE BRIDGE STRUCTURE AND MANUFACTURING METHOD THEREOF

(75) Inventors: Huilin Ye, Xiamen (CN); Mingyuan Hong, Xiamen (CN); Lichun Yang, Xiamen (CN); Congming Chen, Xiamen (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 453 days.

(21) Appl. No.: 13/610,880

(22) Filed: Sep. 12, 2012

(65) Prior Publication Data

US 2013/0105294 A1     May 2, 2013

(30) Foreign Application Priority Data

Nov. 2, 2011    (CN) .......................... 2011 1 0347217

(51) Int. Cl.
*G06F 3/044*     (2006.01)
*C09K 19/02*     (2006.01)

(52) U.S. Cl.
CPC ................ *G06F 3/044* (2013.01); *C09K 19/02* (2013.01); *G06F 2203/04111* (2013.01)

(58) Field of Classification Search
CPC ................................. G06F 3/044; C09K 19/02
USPC ............ 200/600; 345/173–174; 428/1.5, 212, 428/213
See application file for complete search history.

(56) References Cited

U.S. PATENT DOCUMENTS

| | | | |
|---|---|---|---|
| 5,667,880 A * | 9/1997 | Okaniwa ........................ 428/212 |
| 7,864,503 B2 * | 1/2011 | Chang ............................ 345/173 |
| 8,659,822 B2 * | 2/2014 | Chen et al. ..................... 359/359 |
| 2010/0171718 A1 * | 7/2010 | Denda ............................ 345/173 |
| 2012/0169647 A1 * | 7/2012 | Kuo ................................ 345/174 |
| 2012/0234663 A1 * | 9/2012 | Hwang et al. ................. 200/600 |
| 2014/0333578 A1 * | 11/2014 | Wu et al. ........................ 345/174 |

FOREIGN PATENT DOCUMENTS

| | | |
|---|---|---|
| TW | 378432 | 4/2010 |
| TW | 201235585 | 10/2010 |

* cited by examiner

*Primary Examiner* — Felix O Figueroa
(74) *Attorney, Agent, or Firm* — Hauptman Ham, LLP

(57) ABSTRACT

A touch panel with a conductive bridge structure has an anti-reflective layer disposed on the conductive bridge. Due to the anti-reflective layer, visual difference of a touch screen can be eliminated and the manufacturing process can be reduced.

16 Claims, 3 Drawing Sheets

TOUCH PANEL WITH A CONDUCTIVE BRIDGE STRUCTURE AND MANUFACTURING METHOD THEREOF

BACKGROUND OF THE INVENTION

This Application claims the benefit of the People's Republic of China Application No. 201110347217.6, filed on Nov. 2, 2011.

FIELD OF THE INVENTION

The present disclosure relates to a touch panel and a manufacturing method thereof. More particularly, the present disclosure relates to a touch panel with a conductive bridge structure and a manufacturing method thereof.

DESCRIPTION OF THE RELATED ART

A touch panel usually comprises a substrate, sensing pads arranged along a first axis, and sensing arrays arranged along a second axis on the substrate, wherein the sensing pads arranged along the first axis are electrically connected by a conductive bridge and are electrically insulated from the sensing arrays arranged along the second axis.

The conductive bridge is made of a lightproof material with high reflectivity (such as molybdenum, aluminum or other metals), so that when touch screen is operated, the conductive bridge reflects light and then a light spot area is formed, namely, a visual difference between the area with the conductive bridge and the area without the conductive bridge appears in the touch screen, leading to visual discomfort for a user.

SUMMARY OF THE INVENTION

In view of the defect of the conventional touch panel, an object of the present disclosure is to provide a touch panel with a conductive bridge structure, forming an anti-reflective layer with a laminated structure on the conductive bridge, such that the conductive bridge is invisible in the touch panel, thereby eliminating the problem of visual difference.

According, to an embodiment of the present disclosure, a touch panel with a conductive bridge structure is provided, and an anti-reflective layer is disposed on the conductive bridge.

The anti-reflective layer comprises: a first refractive index layer covering the conductive bridge and a second refractive index layer located on the first refractive index layer, wherein refractive index of the first refractive index layer is lower than that of the conductive bridge and refractive index of the second refractive index layer is higher than that of the first refractive index layer.

The anti-reflective layer further comprises a third refractive index layer located on the second refractive index layer, wherein refractive index of the third refractive index layer is lower than that of the second refractive index layer. The conductive bridge structure further comprises a protection layer covering the third refractive index layer, wherein refractive index of the third refractive index layer is lower than that of the protection layer.

Thickness of the first refractive index layer is 19~23 nm: thickness of the second refractive index layer is 9~13 nm; and thickness of the third refractive index layer is 22~28 nm.

The first refractive index layer and the third refractive index layer are made of a transparent conductive material, and the second refractive index layer is made of a conductive metal material. Preferably, the transparent conductive material is indium tin oxide (ITO), aluminum zinc oxide (AZO) or antimony tin oxide (ATO), and the conductive metal material is aluminum (Al), chromium (Cr), molybdenum (Mo) or copper (Cu).

According to another embodiment of the present disclosure, a method of manufacturing a touch panel with a conductive bridge structure is provided, the method comprising the following step: forming an anti-reflective layer to cover the conductive bridge.

The step of forming the anti-reflective layer comprises: forming a first refractive index layer to cover the conductive bridge; and forming, a second refractive index layer on the first refractive index layer, wherein refractive index of the first refractive index layer is lower than that of the conductive bridge and refractive index of the second refractive index layer is higher than that of the first refractive index layer.

The step of forming the anti-reflective layer further comprises: forming a third refractive index layer to cover the second refractive index layer, wherein refractive index of the third refractive index layer is lower than that of the second refractive index layer. The step of forming the anti-reflective layer further comprises forming a protection layer to cover the anti-reflective layer. The conductive bridge and the anti-reflective layer are formed by a same patterning process.

For the touch panel of the present disclosure, an anti-reflective layer is formed on a conductive bridge structure by adjusting refractive indices of different refractive index layers in the anti-reflective layer, wherein reflectivity of the anti-reflective layer can be reduced such that the conductive bridge is invisible in the touch panel, thereby eliminating the problem of visual difference.

BRIEF DESCRIPTION OF THE DRAWINGS

For those skilled in the art to understand the present disclosure, numerous embodiments are described below, annexing drawings to minutely illustrate the matters of the disclosure and the purpose thereof.

DETAILED DESCRIPTION OF THE EMBODIMENTS

Figure 1A:
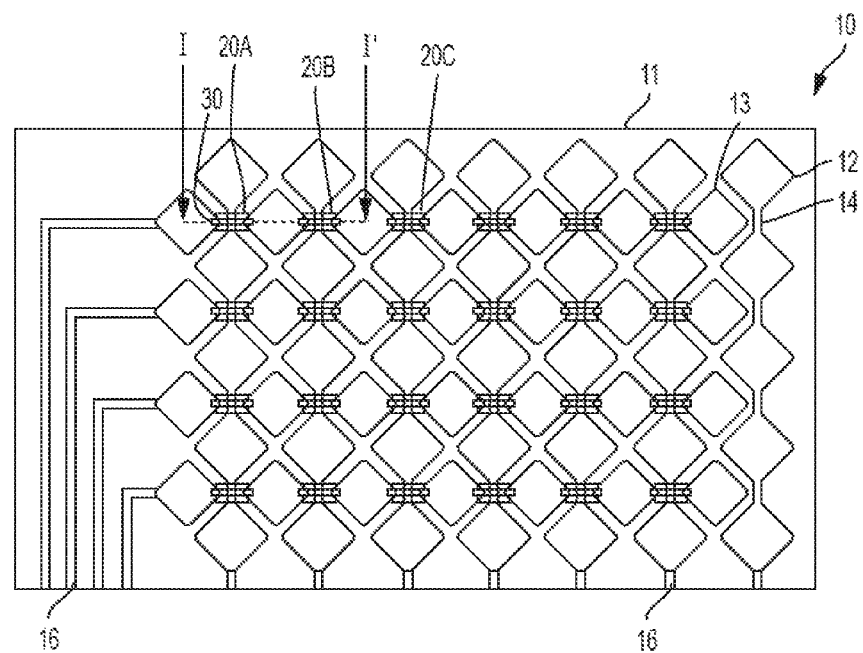
FIG. 1A is a schematic view of an electrode structure of a capacitive touch panel.
Figure 1B:
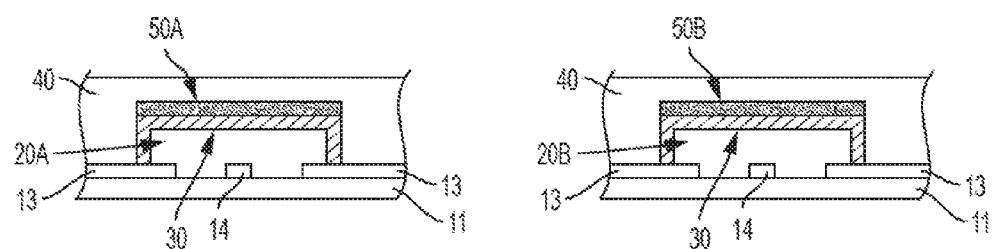
FIG. 1B is a schematic sectional view along a section line I-I' shown in FIG. 1A.

FIG. 1A is a schematic view of an electrode structure of a touch panel. A touch panel 10 usually comprises a substrate 11, first sensing pads 12 arranged along a first axis and second sensing pads 13 arranged along a second axis on the substrate 11. The two adjacent first sensing pads 12 are connected by a conductive wire 14. Insulation layer 20 includes a plurality of insulation elements 20A-C. The two adjacent second sensing pads 13 are disposed respectively at two sides of the conductive wire 14 and connected by a conductive bridge 30 that crosses over the conductive wire 14, and the conductive bridge 30 is electrically insulated from the conductive wire 14 by means of an insulation layer 20. Moreover, a plurality of metal wires 16 is disposed at the periphery of the electrodes to transmit signals sensed to the external. The conductive bridge 30 can be made of a lightproof material with high reflectivity (such as molybdenum, aluminum or other metals), so that when a touch panel is operated, the conductive bridge 30 can reflect light and then a light spot area is found. Thus, as shown in FIG. 1B, disposing anti-reflective element 50A of a plurality the anti-reflective elements 50A-B of the anti-reflective layer 50 on conductive bridge 30 (details will be described subsequently) can solve the problem of light spot, making the conductive bridge invisible in the touch panel and thereby eliminating the problem of visual difference. The above described touch panel structure is only an embodiment of the present disclosure, but it is not limited thereto. If there are elements that can cause a light spot in other touch panel structures, the anti-reflective layer of the present disclosure is also applicable.

FIG. 1B is a schematic sectional view along a section line I-I' shown in FIG. 1A. Insulation element 20A (or 20B) of the insulation layer 20 covers a corresponding conductive wire 14 and conductive bridge 30 crosses over the insulation element 20A (or 20B) to connect adjacent second sensing pads 13. Anti-reflective element 50A (or 50B) of the anti-reflective layer 50 covers conductive bridge 30, and second sensing pads 13 are exposed from anti-reflective layer 50. A protection layer 40 covers anti-reflective element 50A (or 50B) and the adjacent second sensing pads 13. In addition, as shown in FIG. 1B, the anti-reflective elements 50A-B are patterned in a manner such that each of the anti-reflective elements 50A-B of the anti-reflective layer 50 covers a corresponding conductive bridge 30, and still the first sensing pads 12 and the second sensing pads 13 are exposed from the anti-reflective layer 50. The anti-reflective layer 50 can be a single-layer structure made of a material, reflectivity of which is lower than that of the conductive bridge, such as indium tin oxide (ITO), aluminum zinc oxide (AZO), antimony tin oxide (ATO) or other transparent conductive materials, or can be a multi-layer structure (as shown in FIG. 2~FIG. 4), wherein a multi-layer structure is preferred.

Figure 2:
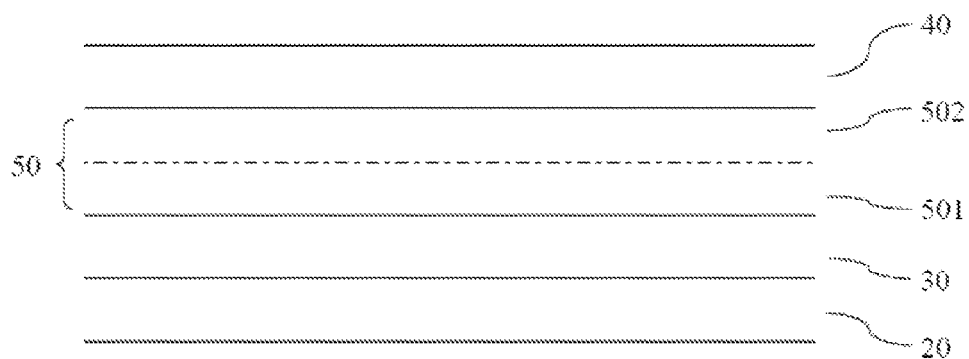
FIG. 2 is a schematic view of an anti-reflective layer composed of two layers of materials in a touch panel with a conductive bridge structure in accordance with the present disclosure.

FIG. 2 is a schematic view of an anti-reflective layer composed of two layers of materials in a touch panel with a conductive bridge structure in accordance with the present disclosure. As shown in FIG. 2, element symbol 20 refers to an insulation layer and element symbol 30 refers to a conductive bridge. A transparent conductive material layer used as a first refractive index layer 501, a conductive metal material layer used as a second refractive index layer 502, and a photoresistive layer (not shown), used for patterning, is formed (such as coating) on the conductive bridge 30 in sequence, wherein refractive index of the first refractive index layer 501 is lower than that of the conductive bridge 30 and refractive index of the second refractive index layer 502 is higher than that of the first refractive index layer 501. The transparent conductive material of the first refractive index layer 501 can include indium tin oxide (ITO), aluminum zinc oxide (AZO) or antimony tin oxide (ATO), and the conductive metal material of the second refractive index layer 502 can include aluminum (Al), chromium (Cr), molybdenum (Mo) or copper (Cu). After exposure, an anti-reflective layer 50 with a laminated structure is formed by etching with acidic etchant. In other words, the anti-reflective layer 50 is patterned, by an etching method, to form the plurality of anti-reflective elements 50A-B (as shown in FIG. 1B), and each of the anti-reflective elements 50A-B covers a corresponding conductive bridge 30. Then, a protection layer 40 is coated on the anti-reflective elements 50A-B of the anti-reflective layer 50.

Figure 3:
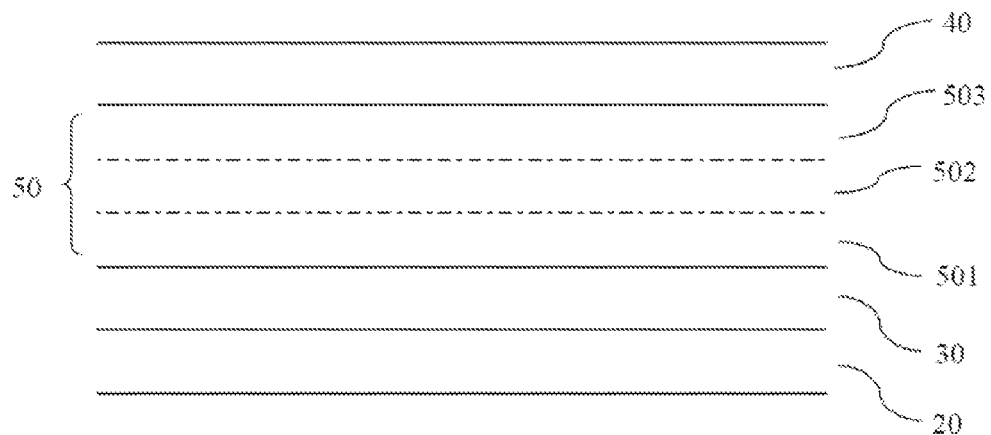
FIG. 3 is a schematic view of an anti-reflective layer composed of three layers of materials in a touch panel with a conductive bridge structure in accordance with the present disclosure.
Figure 4:
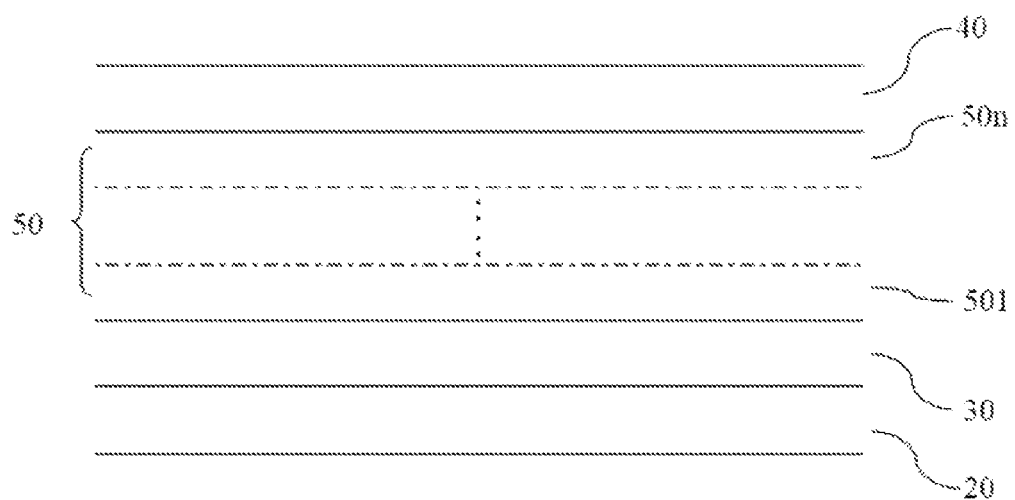
FIG. 4 is a schematic view of an anti-reflective layer composed of n layers of materials in a touch panel with a conductive bridge structure in accordance with the present disclosure.

As shown in FIG. 3, another transparent conductive material layer as a third refractive index layer 503 can be coated on the second refractive index layer 502 to adjust refractive index of the anti-reflective layer 50. Refractive index of the third refractive index layer 503 is lower than that of the second refractive index layer 502. The transparent conductive material of the third refractive index layer 503 can include indium tin oxide (ITO), aluminum zinc oxide (AZO) or antimony tin oxide (ATO). According to the requirement, the laminated structure of the anti-reflective layer 50 can have more than three layers by coating to further adjust refractive index of the anti-reflective layer 50, as first refractive index layer 501, second refractive index layer 502 . . . nth refractive index layer 50n, as shown in FIG. 4.

Various embodiments have been described below giving a brief idea about material composition and thickness of each layers of the anti-reflective layer 50 coated on the conductive bridge 30.

Embodiment 1

An anti-reflective layer 50 having, three refractive index layers made of ITO, Cr and ITO respectively and a photoresistive layer used for patterning are coated on a conductive bridge 30 in sequence. After exposure, an acidic etchant is used for etching such that the conductive bridge 30 together with the anti-reflective layer 50 has the following structure: the conductive bridge 30/ITO (thickness: 21 nm)/Cr (thickness: 12 nm)/ITO (thickness: 25 nm).

Embodiment 2

An anti-reflective layer 50 having, three refractive index layers made of ITO, Al and ITO respectively and a photoresistive layer used for patterning are coated on a conductive bridge 30 in sequence. After exposure, an acidic etchant is used for etching such that the conductive bridge together with the anti-reflective layer 50 has the following structure: the conductive bridge/ITO (thickness: 21 nm)/Al (thickness: 10 nm)/ITO (thickness: 25 nm).

Embodiment 3

An anti-reflective layer 50 having three refractive index layers made of AZO, Al and AZO respectively and a photoresistive layer used for patterning are coated on a conductive bridge 30 in sequence. After exposure, an acidic etchant is used for etching such that the conductive bridge together with the anti-reflective layer 50 has the following structure: the conductive bridge/AZO (thickness: 20 nm)/Al (thickness: 11 nm)/AZO (thickness: 23 nm).

Embodiment 4

An anti-reflective layer 50 having three refractive index layers made of ATO, Mo and ATO respectively and a photoresistive layer used for patterning are coated on a conductive bridge 30 in sequence. After exposure, an acidic etchant is used for etching such that the conductive bridge together with the anti-reflective layer 50 has the following structure: the conductive bridge/ATO (thickness: 22 nm)/Mo (thickness: 12 nm)/ATO (thickness: 27 nm).

Embodiment 5

An anti-reflective layer 50 having three refractive index layers made of AZO, Cr and AZO respectively and a photoresistive layer used for patterning are coated on a conductive bridge 30 in sequence. After exposure, an acidic etchant is used for etching such that the conductive bridge together with the anti-reflective layer 50 has the following structure: the conductive bridge/AZO (thickness: 20 nm)/Cr (thickness: 10 nm)/AZO (thickness: 28 nm).

By adjusting materials and coating thickness of the laminated layers of the anti-reflective layer, refractive index of the anti-reflective layer can be reduced, thereby making the conductive bridge under the anti-reflective layer invisible. In the above embodiments, thickness of the first, second and third refractive index layers which form the anti-reflective layer is within the scope of 19~23 nm, 9~13 nm and 22~28 nm respectively, thereby achieving a preferable effect.

While certain embodiments have been shown and described, various modifications and substitutions may be made thereto without departing from the spirit and scope of the disclosure. Accordingly, it is to be understood that the present invention has been described by way of illustration and not limitations.

What is claimed is:

1. A touch panel comprising,
    a plurality of first-axis sensing pads;
    a plurality of second-axis sensing pads;
    a plurality of first-axis conductive wires respectively disposed between the adjacent first-axis sensing pads thereby forming electrically connected first-axis conductor cells;
    a plurality of second-axis conductive bridges respectively disposed between the adjacent second-axis sensing pads thereby forming electrically connected second-axis conductor cells;
    an insulation layer comprising a plurality of insulation elements wherein each of the insulation elements is formed between the corresponding first-axis conductive wire and the second-axis conductive bridge; and
    an anti-reflective layer comprising a plurality of anti-reflective elements disposed on the second-axis conductive bridges, and wherein the anti-reflective elements are patterned in a manner that each of the anti-reflective elements covers the corresponding second-axis conductive bridge, and the first-axis sensing pads and the second-axis sensing pads are exposed from the anti-reflective layer;
    wherein the anti-reflective layer comprises:
        a first refractive index layer disposed on the corresponding second-axis conductive bridge; and
        a second refractive index layer disposed on the first refractive index layer;
        wherein the refractive index of the first refractive index layer is lower than the refractive index of the corresponding second-axis conductive bridge and the refractive index of the second refractive index layer is higher than the refractive index of the first refractive index layer.

2. The touch panel of claim 1, wherein the anti-reflective layer further comprises a third refractive index layer located on the second refractive index layer, wherein the refractive index of the third refractive index layer is lower than the refractive index of the second refractive index layer.

3. The touch panel of claim 1, further comprising a protection layer, wherein the protection layer is directly formed on the anti-reflective layer, the exposed first-axis sensing pads and the exposed second-axis sensing pads.

4. The touch panel of claim 2, wherein the thickness of the first refractive index layer is from 9 to 23 nm, the thickness of the second refractive index layer is from 9 to 13 nm, and the thickness of the third refractive index layer is from 22 to 28 nm.

5. The touch panel of claim 2, wherein the first refractive index layer and the third refractive index layer are made of a transparent conductive material and the second refractive index layer is made of a conductive metal material.

6. The touch panel of claim 5, wherein the transparent conductive material comprises indium tin oxide (ITO), aluminum zinc oxide (AZO), or antimony tin oxide (ATO).

7. The touch panel of claim 5, wherein the conductive metal material comprises aluminum (Al), chromium (Cr), molybdenum (Mo), or copper (Cu).

8. The touch panel of claim 1, wherein the second-axis conductive bridges are made of a metal material.

9. The touch panel of claim 1, wherein the anti-reflective layer further comprises a third refractive index layer located on the second refractive index layer, wherein the refractive index of the third refractive index layer is lower than the refractive index of the second refractive index layer, and wherein the first refractive index layer is an indium tin oxide (ITO) layer having a thickness of 21 nm, the second refractive index layer is a chromium (Cr) layer having a thickness of 12 nm and the third refractive index layer is an ITO layer having a thickness of 25 nm.

10. The touch panel of claim 1, wherein the anti-reflective layer further comprises a third refractive index layer located on the second refractive index layer, wherein the refractive index of the third refractive index layer is lower than the refractive index of the second refractive index layer, and wherein the first refractive index layer is an indium tin oxide (ITO) layer having a thickness of 21 nm, the second refractive index layer is an aluminum (Al) layer having a thickness of 10 nm and the third refractive index layer is an ITO layer having a thickness of 25 nm.

11. The touch panel of claim 1, wherein the anti-reflective layer further comprises a third refractive index layer located on the second refractive index layer, wherein the refractive index of the third refractive index layer is lower than the refractive index of the second refractive index layer, and wherein the first refractive index layer is an aluminum zinc oxide (AZO) layer having a thickness of 20 nm, the second refractive index layer is an aluminum (Al) layer having a thickness of 11 nm and the third refractive index layer is an AZO layer having a thickness of 23 nm.

12. The touch panel of claim 1, wherein the anti-reflective layer further comprises a third refractive index layer located on the second refractive index layer, wherein the refractive index of the third refractive index layer is lower than the refractive index of the second refractive index layer, and wherein the first refractive index layer is an antimony tin oxide (ATO) layer having a thickness of 22 nm, the second refractive index layer is a molybdenum (Mo) layer having a thickness of 12 nm and the third refractive index layer is an ATO layer having a thickness of 27 nm.

13. The touch panel of claim 1, wherein the anti-reflective layer further comprises a third refractive index layer located on the second refractive index layer, wherein the refractive index of the third refractive index layer is lower than the refractive index of the second refractive index layer, and wherein the first refractive index layer is an aluminum zinc oxide (AZO) layer having a thickness of 20 nm, the second refractive index layer is a chromium (Cr) layer having a thickness of 10 nm and the third refractive index layer is an AZO layer having a thickness of 28 nm.

14. The touch panel of claim 1, further comprising a protection layer, wherein the protection layer is directly coated on the anti-reflective layer, the exposed first-axis sensing pads and the exposed second-axis sensing pads.

15. The touch panel of claim 1, further comprising a plurality of wires connected to the first-axis sensing pads and the second-axis sensing pads.

16. The touch panel of claim 1, wherein each of the insulation layers overlays the corresponding first-axis conductive wire, and each of the second-axis conductive bridges crosses over the corresponding insulation layer.

\* \* \* \* \*